(12) United States Patent
Adams et al.

(10) Patent No.: US 8,429,115 B1
(45) Date of Patent: Apr. 23, 2013

(54) MEASURING CHANGE DISTANCE OF A FACTOR IN A DECISION

(75) Inventors: William James Louis Adams, DeLand, FL (US); Daniel Lowell Saaty, Falls Church, VA (US)

(73) Assignee: Decision Lens, Inc., Arlington, VA (US)

( * ) Notice: Subject to any disclaimer, the term of this patent is extended or adjusted under 35 U.S.C. 154(b) by 600 days.

(21) Appl. No.: 12/646,312

(22) Filed: Dec. 23, 2009

(51) Int. Cl.
G06F 17/00 (2006.01)
G06N 7/00 (2006.01)
G06N 7/08 (2006.01)

(52) U.S. Cl.
USPC .......................................................... 706/59

(58) Field of Classification Search .................. 706/59
See application file for complete search history.

(56) References Cited

U.S. PATENT DOCUMENTS

| | | | |
|---|---|---|---|
| 5,844,817 A | 12/1998 | Lobley et al. |
| 6,151,565 A | 11/2000 | Lobley et al. |
| 6,502,126 B1 | 12/2002 | Pendakur |
| 6,643,645 B1 | 11/2003 | Fayyad et al. |
| 6,785,709 B1 | 8/2004 | Pendakur |
| 6,850,891 B1 | 2/2005 | Forman |
| 6,882,989 B2 | 4/2005 | Stevens |
| 6,907,566 B1 | 6/2005 | McElfresh et al. |
| 6,963,901 B1 | 11/2005 | Bates et al. |
| 7,080,071 B2 | 7/2006 | Henrion et al. |
| 7,203,755 B2 | 4/2007 | Zhu et al. |
| 7,257,566 B2 | 8/2007 | Danielson et al. |
| 7,353,253 B1 | 4/2008 | Zhao |
| 7,398,257 B2 | 7/2008 | Kaji |
| 7,542,952 B2 | 6/2009 | Yang et al. |
| 7,552,104 B2 | 6/2009 | Hansen et al. |
| 7,624,069 B2 | 11/2009 | Padgette |

(Continued)

FOREIGN PATENT DOCUMENTS

| | | |
|---|---|---|
| WO | WO 01/08070 A1 | 2/2001 |
| WO | WO 01/20530 | 3/2001 |
| WO | WO 2008/057178 | 5/2008 |
| WO | WO 2009/026589 A3 | 2/2009 |

OTHER PUBLICATIONS

The Analytic Hierarchy and Analytic Network Measurement Processes: Applications to Decisions under Risk Thomas L. Saaty[1] [1]University of Pittsburgh, Pittsburgh, PA 15260, USA.*

(Continued)

*Primary Examiner* — Kakali Chaki
*Assistant Examiner* — Ababacar Seck
(74) *Attorney, Agent, or Firm* — Posz Law Group, PLC

(57) ABSTRACT

An analytic network process (ANP) storage memory stores an ANP weighted supermatrix representing an ANP model. A processor is in communication with the ANP storage memory. The processor fixes each one of plural nodes one at a time in the ANP model and measures a row sensitivity of each of the nodes as it is fixed, the row sensitivity being measured using one or both of (i) a predetermined increase value and (ii) a predetermined decrease value. Also, it scores how much synthesized alternatives scores found by doing ANP row sensitivity on each of the fixed nodes change from original values thereof, to generate a value indicating a change distance for each of the nodes. A same proportionality is maintained in the stored ANP weighted supermatrix as the fixed node is changed by the predetermined increase and/or decrease values.

18 Claims, 4 Drawing Sheets

U.S. PATENT DOCUMENTS

| | | |
|---|---|---|
| 7,689,592 B2 | 3/2010 | Denton et al. |
| 7,716,360 B2 | 5/2010 | Angelov |
| 7,827,239 B2 | 11/2010 | Bodin et al. |
| 7,844,670 B2 | 11/2010 | Roskowski et al. |
| 7,996,344 B1 | 8/2011 | Goel |
| 8,239,338 B1 | 8/2012 | Adams et al. |
| 8,250,007 B2 | 8/2012 | Abido et al. |
| 8,315,971 B1 | 11/2012 | Adams et al. |
| 2001/0027455 A1 | 10/2001 | Abulleil et al. |
| 2003/0069868 A1 | 4/2003 | Vos |
| 2003/0191726 A1 | 10/2003 | Kirshenbaum |
| 2003/0208514 A1 | 11/2003 | Yang et al. |
| 2004/0103058 A1 | 5/2004 | Hamilton |
| 2006/0195441 A1 | 8/2006 | Julia et al. |
| 2006/0224530 A1 | 10/2006 | Riggs et al. |
| 2006/0241950 A1 | 10/2006 | Hansen et al. |
| 2007/0226295 A1 | 9/2007 | Haruna et al. |
| 2008/0103880 A1 | 5/2008 | Saaty |
| 2008/0104058 A1 | 5/2008 | Billmaier et al. |
| 2008/0250110 A1 | 10/2008 | Zhao |
| 2008/0256054 A1* | 10/2008 | Saaty ............................. 707/5 |
| 2010/0153920 A1 | 6/2010 | Bonnet |
| 2010/0318606 A1 | 12/2010 | Sethi et al. |
| 2011/0022556 A1 | 1/2011 | Adams |
| 2012/0053973 A1 | 3/2012 | Elazouni et al. |
| 2012/0133727 A1 | 5/2012 | Bolduc et al. |

OTHER PUBLICATIONS

Liming Zhu, et al., "Tradeoff and Sensitivity Analysis in Software Architecture Evaluation Using Analytic Hierarchy Process," *Software Quality Journal*, (2005), vol. 13, pp. 357-375.

U.S. Appl. No. 12/508,703, filed Jul. 24, 2009, Adams.

U.S. Appl. No. 12/646,099, filed Dec. 23, 2009, Adams.

U.S. Appl. No. 12/646,289, filed Dec. 23, 2009, Adams.

U.S. Appl. No. 12/646,418, filed Dec. 23, 2009, Adams.

Office Action issued by the U.S. Patent Office on Aug. 5, 2008 in connection with related U.S. Appl. No. 11/586,557.

Office Action issued by the U.S. Patent Office on Apr. 14, 2009 in connection with related U.S. Appl. No. 11/586,557.

Office Action issued by the U.S. Patent Office on Apr. 13, 2009 in connection with related U.S. Appl. No. 11/783,436.

Office Action issued by the U.S. Patent Office on Oct. 21, 2009 in connection with related U.S. Appl. No. 11/783,436.

Notification of Transmittal of the International Search Report and the Written Opinion of the International Searching Authority mailed Aug. 25, 2008 in corresponding PCT application No. PCT/US2007/022184.

Notification of Transmittal of the International Preliminary Report on Patentability mailed May 7, 2009 in corresponding PCT application No. PCT/US2007/022184.

Super Decisions Software for Decision Making, Super Decisions Website, (http://web.archive.org/web/20041202040911/http://www.superdecisions.com/ and http://www.superdecisions.com/~saaty/), 2004.

The Super Decisions Software, The Essentials of the Analytic Network Process with Seven Examples, Decision Making with Dependence and Feedback, (http://www.superdecisions.com/~saaty/Fall2005DecisionClass/PowerpointSlides/), Sep. 2005.

The Super Decisions Software, The Analytic Network Process for Decision Making with Dependence and Feedback lecture 2, Tutorial ANP BOCR (http://www.superdecisions/~saaty/Fall2005DecisionClass/PowerpointSlides/) Sep. 2005.

Decision Lens Inc., Decision Lens's Decision Lens Suite™ Product, (http://web.archive.org/web/20050204181100/www.decisionlens.com/index.php), 2004-2005.

Caterinicchia, Dan, "A problem-solving machine," *Federal Computer Week*, (Sep. 4, 2000), 14, 31, p. 48-49.

The Super Decisions Software, The Analytic Network Process, Decision Making with Dependence and Feedback, (http://www.superdecisions.com/~saaty/Fall2005DecisionClass/PowerpointSlides/), Sep. 2005.

Mikhailov et al., "Fuzzy Analytic Network Process and its Application to the Development of Decision Support Systems," IEEE Transactions on Systems, Man, and Cybernetics—Part C: Applications and Reviews, (Feb. 2003), vol. 33, No. 1, p. 33-41.

Decision Lens, Inc., Tutorial on Hierarchical Decision Models (AHP), 2002.

Decision Lens, Inc., Tutorial on Complex Decision Models (ANP), 2002.

Rozann W. Saaty., Decision Making in Complex Environments: The Analytic Network Process (ANP) for Dependence and Feedback Including a Tutorial for the SuperDecisions Software and Portions of the Encyclicon of Application, Dec. 2002.

Rozann W. Saaty., Decision Making in Complex Environments: The Analytic Network Process (ANP) for Dependence and Feedback Including a Tutorial for the SuperDecisions Software and Portions of the Encyclicon of Application, 2005.

Decision Lens, Inc., *MS_Help_Decision_Lens*. "Welcome to Decision Lens Software™," Jun. 6, 2005.

Team Acuity, SAGD ANP Enhancement Functional Requirements Document, (Dec. 15, 2007), p. 1-68.

Decision Lens, Inc., *DLW_Help File*, Dec. 2007.

Decision Lens, Inc., *DLS_Help File*, Dec. 2007.

H. Sun., "AHP in China," International Symposium on the Analytic Hierarchy Process, (Jul. 8-10, 2003), p. 1-21.

Thomas L. Saaty., "Decision-Making with the AHP: Why is The Principal Eigenvector Necessary," International Symposium on the Analytic Hierarchy Process, (Aug. 2-4, 2001), p. 1-14.

Thomas L. Saaty., "The Analytic Network Process: Dependence and Feedback in Decision Making (Part 1) Theory and Validation Examples," International Symposium on the Analytic Hierarchy Process, (Aug. 6-11, 2004), p. 1-10.

Davolt, Steve, "The man who knew too much," *Washington Business Journal*, (Aug. 7, 2007), (http://www.bizjournals.com/washington/stories/2000/08/07/smallb1.html?t=printable).

Roxann Saaty et al., "Decision Making in complex environments," Super Decisions, 2003.

Feglar et al., "Dynamic Analytic Network Process: Improving Decision Support for Information and Communication Technology," ISAHP, Honolulu, Hawaii, (Jul. 8-10, 2003).

Borenstein et al., "A Multi-Criteria Model for the Justification of IT Investments," (Feb. 2005), INFOR v3n1, Canadian Operational Research Society, p. 1-21.

Condon et al., "Visualizing group decisions in the analytic hierarchy process," *Computers & Operation Research*, (2003), 30, p. 1435-1445.

D. Saaty et al., "The Future of the University of Pittsburgh Medical Center: Strategic Planning with the Analytic Network Process," Proceedings of the Fourth International Symposium on the Analytic Hierarchy Process, (Jul. 12-15, 1996), p. 107-121.

U.S. Appl. No. 13/015,754, filed Jan. 28, 2011, Ryan Patrick Gay.

U.S. Appl. No. 13/290, filed Nov. 7, 2011, Adams.

U.S. Appl. No. 13/294,369, filed Nov. 11, 2011, Adams.

Wolfslehner, Bernhard, Vacik, Harald, Lexer, Manfred; "Application of the analytic network process in multi-criteria analysis of sustainable forest management", Forest Ecology and Management, Mar. 2005, pp. 157-170.

Office Action issued by the U.S. Patent Office on Mar. 15, 2012 in connection with related U.S. Appl. No. 12/646,099.

Notice of Allowance issued by the U.S. Patent Office on Apr. 17, 2012 in connection with related U.S. Appl. No. 12/646,099.

Demirtas et al., "An integrated multiobjective decision making process for supplier selection and order allocation", Department of Industrial Engineering, Osmangazi University, 26030 Eskisehir, Turkey, Available online Feb. 28, 2006.

Tuzkaya et al., "An analytic network process approach for locating undesirable facilities: An example from Istanbul, Turkey", Department of Industrial Engineering, Yildiz Technical University, Barbaros Street, Yildiz, Istanbul 34349, Turkey, Available online Jun. 28, 2007.

Adams et al., "Super Decisions Software Guide", Copyright c 1999/2003 Thomas L. Saaty (The software for the Analytic Network Process for decision making with dependence and feedback was developed by William Adams in 1999-2003).

Neaupane et al., "Analytic network process model for landslide hazard zonation", Civil Engineering Program, Sirindhorn Int. Ins. of Technology, Thammasat University, Thailand, Available online May 2, 2008.

T.L. Saaty, "Rank from comparisons and from ratings in the analytic hierarchy/network processes", Katz Graduate School of Business, University of Pittsburgh, 322 Mervis Hall, Pittsburgh, PA 15260, USA, Available online Jun. 25, 2004.

R.W. Saaty, "Validation Examples for the Analytic Hierarchy Process and Analytic Network Process", MCDM 2004, Whistler, B. C. Canada Aug. 6-11, 2004.

Saaty, Thomas L., "The Analytic Hierarchy and Analytic Network Measurement Processes: Applications to Decisions under Risk", University of Pittsburgh, Pittsburgh, PA 15260, USA.

Office Action issued by the U.S. Patent Office on May 29, 2012 in connection with related U.S. Appl. No. 12/646,418.

Office Action issued by the U.S. Patent Office on Jul. 18, 2012 in connection with related U.S. Appl. No. 12/508,703.

Notice of Allowance issued by the U.S. Patent Office on Aug. 1, 2012 in connection with related U.S. Appl. No. 12/646,418.

Office Action issued by the U.S. Patent Office on Aug. 6, 2012 in connection with related U.S. Appl. No. 12/646,289.

Notice of Allowance issued by the U.S. Patent Office on Aug. 31, 2012 in connection with related U.S. Appl. No. 12/508,703.

Office Action issued by the U.S. Patent Office on Nov. 6, 2012 in connection with related U.S. Appl. No. 13/015,754.

* cited by examiner

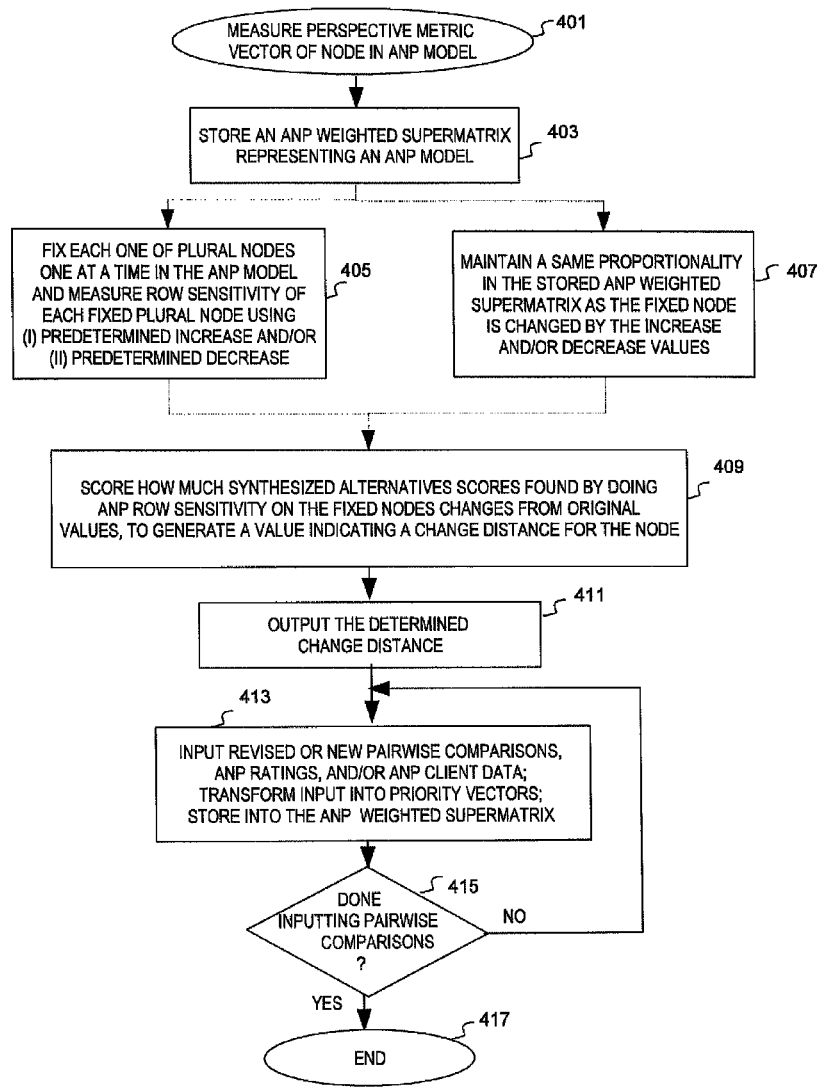

MEASURING CHANGE DISTANCE OF A FACTOR IN A DECISION

TECHNICAL FIELD

The present invention relates in general to measuring, and more specifically to measuring sensitivity of factors in a decision.

BACKGROUND

The factors in a decision can be represented and quantified in an analytic hierarchy process (AHP) model. The AHP model can be used to relate the factors to overall goals, and to evaluate alternative solutions. Measuring sensitivity of factors in AHP trees is generally known. As a result of the measurements of sensitivity of nodes in the tree context, a user can see how influential individual nodes are, such as how sensitive the decision model's alternative scores are to changes in weight of various nodes in the AHP tree. Measuring sensitivity of the factors in a decision can be straightforward in the AHP tree because the AHP model uses a tree structure.

The factors in a decision also can be represented and quantified in an analytic network process (ANP) model. A process of decision making using an ANP model serves to break down large decisions into smaller, manageable decisions. When a decision is represented as a typical ANP model, nodes in the ANP model can be connected to each other without regard for hierarchy level so as to represent the interrelationship between the smaller decisions. The connections that represent the effect of smaller decisions can be synthesized to arrive at the ultimate decision. Measuring sensitivity of a factor in a decision quantified in the ANP model is consequently difficult since the ANP is not a simple tree structure and a change in one factor affects interrelated decisions and may (or may not) affect the ultimate decision.

SUMMARY

Accordingly, one or more embodiments provide an apparatus, method, and/or computer-readable medium for measuring a change distance of a factor in a decision. In an embodiment, an apparatus includes an analytic network process (ANP) storage memory that stores an ANP weighted supermatrix representing an ANP model; and a processor in communication with the ANP storage memory. The processor can be configured to provide for fixing each one of plural nodes one at a time in the ANP model and measuring a row sensitivity of each one of the plural nodes as it is fixed, the row sensitivity being measured using one or both of (i) a predetermined increase value and (ii) a predetermined decrease value. Also provided for is scoring how much synthesized alternatives scores found by doing ANP row sensitivity on each of the plural fixed nodes change from original values thereof, to generate a value indicating a change distance for each one of the plural nodes. Further provided for is maintaining a same proportionality in the stored ANP weighted supermatrix as the fixed node is changed by the one or both of the predetermined increase and decrease values.

According to a further embodiment, the row sensitivity uses both the predetermined increase and decrease values, to measure the effect on the synthesized alternatives scores that is caused by changing an importance of each one of the fixed plural nodes by a same amount.

In accordance with yet another embodiment, the synthesized alternatives scores for each one of the plural nodes in the ANP model are compared to the original values thereof, to determine the relative influence of each one of the plural nodes with respect to the ANP model.

Another embodiment calls for utilizing a weighted average of different metrique calculations of the alternative scores on the space $R^n$, where a metrique is defined according to:

$$x=(x_1, x_2, \ldots, x_n)\ y=(y_1, y_2, \ldots, y_n)$$

are two vectors in $R^m$, where $R^n$ is real n-space with the ANP model, $x_i$ is a starting alternative score for alternative i, $y_i$ is an ending alternative score for the alternative i, and d: $R^n \times R^n \rightarrow R$ a continuous function is a metrique calculation iff for all x, $y \in R^n$ $d(x,y) \geq 0$, and $d(x,x)=0$.

In another embodiment, the alternatives scores for each of the plural fixed nodes are synthesized from an induced family of ANP models formed by row perturbations of each of the fixed nodes in the stored ANP weighted supermatrix.

Another embodiment includes an output unit in communication with the processor and configured to output, for a display to a user, the value indicating a change distance for each one of the plural nodes.

In yet another embodiment, there is provided an input unit configured to input, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

FIG. 4 is a flow chart illustrating a procedure to measure change distance of nodes in an ANP model.

DETAILED DESCRIPTION

Figure 1:
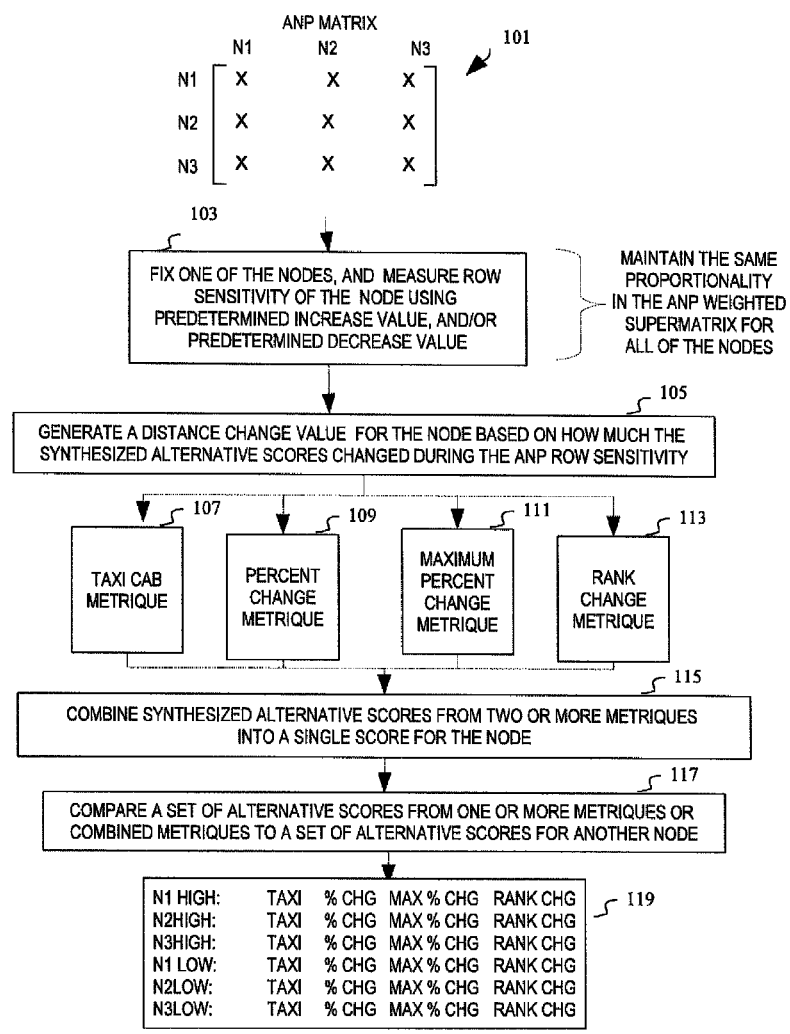
FIG. 1 is a data flow diagram illustrating a measurement of change distance of nodes in an ANP weighted supermatrix.

In overview, the present disclosure concerns computers, computer networks and computer systems, such as an intranet, local area network, distributed network, or the like having a capability of measuring properties of decision models. Such computer networks and computer systems may further provide services such as interacting with users, and/or evaluating modifications to a decision model. More particularly, various inventive concepts and principles are embodied in systems, devices, and methods therein related to measuring properties of an analytic network process model. It should be noted that the term device may be used interchangeably herein with computer, wireless communication unit, or the like. Examples of such devices include personal computers, general purpose computers, personal digital assistants, cellular handsets, and equivalents thereof The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

ANP Influence Analysis

A fundamental question for ANP models is which nodes are the most or least influential to the decision the model represents. ANP row sensitivity opens up many avenues of attack on this problem. We present here one such attack, which involves using the row sensitivity calculation combined with different "metrics" (these distance measures are not metrics in the topological sense, rather they loosely calculate distances). Hence, a new terminology is used to refer to these things, namely, "metriques."

1 Introduction

After an ANP model is created and yields synthesized values for the alternatives we would like to understand how the structure and numerics of the model affect the results of the model. In traditional AHP tree models we can use sensitivity to increase or decrease the importance of a given node, and see how the alternatives change. With the advent of ANP row sensitivity we can perform a similar analysis on ANP models. However, this only yields a weak qualitative analysis of the situation (that is we can only roughly tell that this node appears to move alternatives more or less than the others). A more desirable analysis would be a single non-negative numerical value that describes the quantity of influence for each node.

1.1 Concept of Influence Analysis

The fundamental concept behind ANP influence analysis outlined here is that we wish to combine ANP row sensitivity (the ANP analogue of tree sensitivity) with distance measures describing how far alternative values move in the process of sensitivity. There are two subtleties to handle in doing this analysis. The first is how to use ANP row sensitivity to move the alternatives, and the second is how we will measure distances traveled. We shall deal with the latter first, and the former in the following section.

1.2 Distance Measures and Metriques

There is a whole branch of mathematics devoted to studying distance measures in spaces (metric spaces). Unfortunately, the kind of distance measures we will use sometimes fall outside of this theory (for instance percent change distance). As a result we need to be a bit careful in our terminology from the outset. We cannot call these things "metrics" since those objects have a precise mathematical definition to which we do not wish to limit ourselves. Instead we will use the terminology of a metrique to describe the distance measures we will be using.

Definition 1 (Metrique). Let X be a space, $d: X \times X \rightarrow R$ a continuous function is a metrique if for all $x, y \in X$.

$$d(x,y) \geq 0 \qquad 1.$$

$$d(x,x) = 0 \qquad 2.$$

Note 1. For those with some knowledge of metrics notice there is neither triangle inequality, nor symmetry, nor even an assertion that $d(x, y) = 0$ iff $x = y$. This is a very weak cousin of traditional metrics.

1.3 Review of ANP Row Sensitivity

The following is a brief review of the concepts involved in ANP Row Sensitivity. Applicants' application titled "MEASURING SENSITIVITY OF A FACTOR IN A DECISION", Ser. No. 12/646/289, filed concurrently herewith, is hereby incorporated by reference. The purpose of ANP row sensitivity is to change all of the numerical information for a given node in a way that is consistent with the ANP structure, and recalculate the alternative values (much as tree sensitivity works). We do this by having a single parameter p that is between zero and one, which represents the importance of the given node. There is a parameter value $p_0$ (called the fixed point) which represents returning the node values to the original weights. For parameter values larger than $p_0$ the importance of the node goes up, and for parameter values less than $p_0$ the importance of the node goes down. Once the parameter is set, this updates values in the weighted supermatrix (although it can also be done with the unsealed supermatrix, working by clusters instead) and re-synthesizes. There is essentially one way to do this calculation and preserve the ANP structure of the model. In the notation of that paper, let W be the weighted supermatrix of a single level of our model, ANP row sensitivity constructs a family of row perturbations of W. A family of row perturbations of W is a mapping f: $[0,1] \rightarrow M_{n,n}([0,1])$ that gives a weighted supermatrix f(p) for each parameter value $p \in [0,1]$. This mapping must preserve the ANP structure of our original supermatrix. The only real choice is what to make our fixed point $p_0$. Once we have chosen that, the standard formula for the family of row perturbations of row r of W preserving the ANP structure is labeled $F_{W,r,p_0}: [0,1] \to M_{n,n}([0,1])$ and is defined in the following way.

1. Leave trivial columns unchanged. A trivial column is either a zero column, or a column with all zeroes except one entry that is one.

2. If $0 \leq p \leq p_0$ define $F_{W,r,p_0}(p)$ by scaling the $r^{th}$ row by $$\frac{p}{p_0}$$

and scaling the other entries in the columns so as to keep the matrix stochastic.

3. If $p_0 \leq p \leq 1$ define $F_{W,r,p_0}(p)$ by leaving alone columns of W for which $W_{r,i}=0$ and scaling all entries in the other columns, except for the entry in the $r^{th}$ row, by $$\frac{1-p}{1-p_0}$$

(and change the entry in that $r^{th}$ row so as to keep the matrix stochastic).

2 Influence Analysis

The idea behind influence analysis (as mentioned before) is to use ANP row sensitivity on a given node, and then create a score based on how much the alternative scores change. There are many ways we can use ANP row sensitivity to attempt to understand influence, several of which will be outlined in subsequent papers. (It turns out that many of the ways one might try to use ANP row sensitivity for influence analysis really give other kinds of information than influence.) For now we focus on a particular method and explain why we are using that method.

Let us fix a node that we wish to analyze, let p be our parameter for ANP row sensitivity, and $p_0$ be the fixed point for the family as defined in ANP row sensitivity. There are two possible directions of influence, namely increasing p above $p_0$ and decreasing p below $p_0$. Thus any influence analysis must check both increasing and decreasing values of p. There are several natural possibilities for changing the parameter p which we outline below.

Infinitesimal. We can do a small change in p above $p_0$ and below $p_0$ and look at the rate of change based on that. In the limit this is a derivative calculation, which we call "marginal influence" analysis. Although useful, this only tells how much influence a node has nearby the current values (it may have large marginal influence, but incredibly small influence after moving 0.001 units of p, for instance). This is a standard problem of using a rate of change to measure something about the original quantity. Namely one only knows the instantaneous rate of change at a point, and that rate of change may change dramatically nearby (thus the quantity may not change much even if the rate of change is large, if the rate of change drops to zero quickly).

Component. We can calculate the limit as p goes to 1.0. This does tell us a form of influence. However, if we consider what that calculation means, it means we are taking nearly all of the priority from other nodes and giving them to our node. This essentially is telling us what the synthesis looks like from the perspective of the given node, and not directly telling us the influence of that node.

Our influence analysis. We could fix a parameter value larger than $p_0$, denoted $p_+$ and fix a parameter value smaller than $p_0$, denoted $p_-$. We can then move the parameter p to those two values and consider how far the alternatives have moved. In that way we can compare the distance the alternatives are moved depending on which node we use. We will use the lower/upper bound method to determine influence, in part because the infinitesimal and component methods outlined above do not show influence, but other useful information. By moving the parameter p to the same lower and upper values for each node (which corresponds to changing the importance of each node by the same amount) we can see which node affects the synthesized values for the alternatives most. In order to compare which node influences the alternative scores most we need a metrique to describe how far the alternatives have traveled from their initial values.

2.1 Metriques Used

There are several metriques which are natural to use to compare one set of alternative scores to another set. The following are some standard metriques we used in analyzing the examples given at the end (not all of these are reported in the examples, only the ones we have found most useful for the given calculation). However, it is by no means to be considered all inclusive. All of the metriques below are on the space $R^n$. Let $$x=(x_1, x_2, \ldots, x_n) \, y=(y_1, y_2, \ldots, y_n)$$

be two vectors in $R^n$ (we will use these to write the formulas for each of the following):

Taxi cab: This is the standard taxi cab metric. The taxi cab distance between x and y is given by $$\text{taxi cab distance} = |x_1-y_1|+|x_2-y_2|+\ldots+|x_n-y_n|$$

Percent change: This is the sum of percent changes in the components of x and y. Since we are allowing components of x to be zero, we need to be careful in defining percent change there. This case will happen very infrequently in actual ANP sensitivity. Since it is impossible to define percent change from a 0 starting value, we define it to be 0. The formula is given by $$\text{percent change distance} = \sum_{i=1}^{n} \begin{cases} \left|\frac{x_i - y_i}{x_i}\right| & \text{if } x_i \neq 0 \\ 0 & \text{if } x_i = 0 \end{cases}$$

Maximum percent change: This is similar to the previous metrique. The only difference being we pick the maximum percent change component instead of summing the components.

Rank change: This is a simple formulation of how much the ranking of vector x and y differ. The ranking of x simply is the information of which component of x is largest, second largest etc, and is stored in an integer vector $r^x \in Z^n$. Where $r^x_i$ is the ranking of the $i^{th}$ component of x. (For instance if x=(0.3, 0.1, 0.2, 0.7) then $r^x=(2, 4, 3, 1)$ because the largest component of x is the fourth, thus $r^x_4=1$. The second largest component of x is the first component, thus $r^x_1=2$.) The ranking change metrique just takes the taxi cab distance between $r^x$ and $r^y$ (that is the difference of the rankings of each vector).

2.2 Combinations of Metriques

Each of the metriques mentioned above measures distances slightly differently. A small overall change can cause many rank changes (and likewise a large overall change can leave rankings unchanged). Similarly a 100% change of the value 0.01 only changes it to 0.02 which is a small overall change (even though it is a large percent change). Thus there is no clear choice about which metrique to use in all circumstances.

We can remedy this by making the choice on a per model basis. To give us flexibility we could take a weighted average of the different metriques. We could have a metrique that weighs rank changes highly, and percent changes next highest, and finally gives a small amount of weight to taxi cab changes. We can picture this as having a tree sensitivity view where the nodes are the different metriques available with scores next to them (these scores would always add to one). We could weight one metrique higher by dragging the bar next to that metrique out longer (and thereby shortening the remaining metrique's bars).

2.3 Lower and Upper Parameter Value

The lower parameter value $p_-$ and upper value $p_+$ must be fixed for any particular influence analysis (although clearly we are free to choose different lower and upper values to compare with at a later point). That is, we must use the same values for $p_-$ and $p_+$ for each node in the model when doing influence analysis. However, after that influence analysis is completed we may choose to use different values, and compare the results. Such a varied approach gives us useful information. There are several issues which can be addressed by varying these values.

By choosing values of $p_-$ and $p_+$ close to, and equidistant from $p_0$ we can see how much influence the nodes have for smaller changes.

By choosing values of $p_-$ and $p_+$ far from, and equidistant from $p_0$ we can see how much influence the nodes have for large changes.

We can also break the equidistant rules mentioned above. Although keeping the upper and lower value equidistant from the starting value may appear to be a good approach, it has one significant drawback. Namely lower parameter values have far less influence by their nature. That is, moving p to one places all priority on the given node and takes away every other nodes priority (a huge change). However, moving p towards zero moves priority away from the given node and proportionately redistributes that priority to the rest of the nodes (a much smaller change). We can remedy this inequality by pushing $p_-$ further away from $p_0$ than $p_+$ is.

3 Examples

Throughout the examples we use the family of row perturbations defined in ANP row sensitivity. The following examples are calculated with $p_-=0.1$ and $p_+=0.9$ unless otherwise marked. These are large values for the upper and lower bounds. However they do reveal both interesting and useful changes. Perhaps most surprisingly they reveal many nodes with little to no influence whatsoever.

3.1 4node2.mod

This model has two clusters, "A1 criteria" and "Alternatives". There are two criteria "A" and "B", and two alternatives "1" and "2". All nodes are connected to each other, and the weighted supermatrix is as follows (the ordering of nodes in the supermatrix is "A", "B", "1", "2").

$$W = \begin{bmatrix} 0.3750 & 0.2000 & 0.0500 & 0.3333 \\ 0.1250 & 0.3000 & 0.4500 & 0.1667 \\ 0.3333 & 0.0500 & 0.2750 & 0.1500 \\ 0.1667 & 0.4500 & 0.2250 & 0.3500 \end{bmatrix}$$

Keeping with the notation of ANP row sensitivity setting the parameter to 0.1 in row 1 we get the following new scaled supermatrix.

$$F_{W,1,0.5}(0,1) = \begin{bmatrix} 0.0750 & 0.0400 & 0.0100 & 0.0667 \\ 0.1850 & 0.3600 & 0.4690 & 0.2333 \\ 0.4933 & 0.0600 & 0.2866 & 0.2100 \\ 0.2467 & 0.5400 & 0.2345 & 0.4900 \end{bmatrix}$$

The limit matrix is:

$$L = \begin{bmatrix} 0.047829 & 0.047829 & 0.047829 & 0.047829 \\ 0.315993 & 0.315993 & 0.315993 & 0.315993 \\ 0.190763 & 0.190763 & 0.190763 & 0.190763 \\ 0.445415 & 0.445415 & 0.445415 & 0.445415 \end{bmatrix}$$

which gives us the following synthesized alternative scores shown in Table 1.

TABLE 1

| Alternative | Normal | Ideal | Raw |
|---|---|---|---|
| 1 | 0.299858 | 0.428281 | 0.190763 |
| 2 | 0.700142 | 1.000000 | 0.445415 |

The following Table 2 is a collection of results setting upper and lower parameter values for each node and the corresponding changes in output as actually computed by a software implementation.

TABLE 2

| | Param | Max % chg | Rank chg | Alt 1 | Alt 2 |
|---|---|---|---|---|---|
| Original | 0.5 | 0.0000 | 0 | 0.39 | 0.61 |
| A: high | 0.9 | 0.5376 | 2 | 0.63 | 0.37 |
| B: high | 0.9 | 0.7324 | 0 | 0.15 | 0.85 |
| 1: high | 0.9 | 0.9414 | 2 | 0.94 | 0.06 |
| 2: high | 0.9 | 0.9425 | 0 | 0.04 | 0.96 |
| A: low | 0.1 | 0.3415 | 0 | 0.3 | 0.7 |
| B: low | 0.1 | 0.4238 | 0 | 0.48 | 0.52 |
| 1: low | 0.1 | 0.8206 | 0 | 0.1 | 0.9 |
| 2: low | 0.1 | 0.7550 | 2 | 0.8 | 0.2 |

Since the alternatives are also nodes we can view the influence of the alternatives on the decision. In rare instances this may be useful, however, most of the time this is a fairly useless calculation. So to analyze this, we really need only consider the criteria "A" and "B". Table 3 of values for them alone is:

TABLE 3

| | Param | Max % chg | Rank chg | Alt 1 | Alt 2 |
|---|---|---|---|---|---|
| Original | 0.5 | 0.0000 | 0 | 0.39 | 0.61 |
| A: high | 0.9 | 0.5376 | 2 | 0.63 | 0.37 |
| B: high | 0.9 | 0.7324 | 0 | 0.15 | 0.85 |
| A: low | 0.1 | 0.3415 | 0 | 0.3 | 0.7 |
| B: low | 0.1 | 0.4238 | 0 | 0.48 | 0.52 |

Looking at this table we already see something interesting. By maximum percentage change node "B" appears to be the most influential. However node "A" is the one that gives rise to a rank change (changing upwards the influence of node "A"). Thus if we are scoring rank changes higher than movement of alternative scores, node "A" would be considered the most influential. If we are scoring movement of alternatives scores higher node "B" would be the most influential. If we allow weighting of these various metrics we can arrive at a blending of these results that would most match the preferences one has on the importance of the various metriques.

3.2 BigBurger.mod

The following is the table of influence analysis as generated by our software implementation, for the model BigBurger.mod that is included in the Super Decisions sample models directory. The results in Table 4 have been sorted on the maximum percent change column.

TABLE 4

|  | Param | Max % chg | Taxi Cab | McD | BK | Wen |
|---|---|---|---|---|---|---|
| Original Values | 0.5 | 0.00% | 0 | 0.63 | 0.23 | 0.13 |
| 1 Subs | 0.9 | 231.91% | 0.87 | 0.41 | 0.31 | 0.28 |
| 5 Drive Thru | 0.9 | 52.75% | 0.28 | 0.77 | 0.13 | 0.1 |
| 1 White Collar | 0.9 | 51.76% | 0.2 | 0.73 | 0.2 | 0.07 |
| 3 Students | 0.9 | 48.65% | 0.17 | 0.71 | 0.21 | 0.08 |
| 2 Blue Collar | 0.9 | 48.64% | 0.17 | 0.71 | 0.21 | 0.08 |
| 2 Recycling | 0.9 | 45.77% | 0.22 | 0.73 | 0.18 | 0.08 |
| 4 Families | 0.9 | 45.20% | 0.12 | 0.69 | 0.23 | 0.08 |
| 3 Parking | 0.9 | 39.45% | 0.17 | 0.71 | 0.2 | 0.09 |

There are a few things to note here. First a rank change column was not included because none of these caused any rank changes. Second, only the top few scoring nodes were included in this list. Third, the node "1 Subs" is clearly the most influential by a large margin. Even though "1 Subs" does not cause a rank change, it does make a huge change in the numerics of the result.

Using value of $p_-=0.1$ and $p_+=0.9$ are rather large changes. If we wish to view smaller changes we can use 0.3 and 0.7 respectively. Using those values, sorting and showing the top few results we get the following Table 5.

TABLE 5

|  | Param | Max % chg | McD | BK | Wen |
|---|---|---|---|---|---|
| Original Values | 0.5 | 0.00% | 0.63 | 0.23 | 0.13 |
| 1 Subs | 0.7 | 80.62% | 0.53 | 0.26 | 0.2 |
| 5 Drive Thru | 0.7 | 27.95% | 0.7 | 0.19 | 0.12 |
| 1 White Collar | 0.7 | 25.92% | 0.68 | 0.22 | 0.11 |
| 3 Students | 0.7 | 23.13% | 0.67 | 0.22 | 0.11 |
| 2 Blue Collar | 0.7 | 23.08% | 0.67 | 0.22 | 0.11 |
| 2 Recycling | 0.7 | 23.05% | 0.68 | 0.21 | 0.11 |
| 4 Families | 0.7 | 22.72% | 0.66 | 0.23 | 0.11 |
| 3 Parking | 0.7 | 21.88% | 0.68 | 0.21 | 0.11 |

Since we are making smaller changes in the parameter, the resulting maximum percentage change is smaller. However, we still get the same ordering of the top few scoring nodes.

Referring now to FIG. 1, a data flow diagram illustrating a measurement of change distance of nodes in an ANP weighted supermatrix will be discussed and described. FIG. 1 provides an overview of the various techniques discussed in greater detail herein. FIG. 1 illustrates an ANP matrix 101 generated using known techniques. Values are represented in the illustration by an "x". The ANP model represents factors in a decision. In this example, there are three nodes N1, N2, N3, representative of two or more nodes in an ANP model. How to set up the ANP weighted supermatrix 101 so that it represents a decision and the factors involved are well known and the reader is assumed to be familiar with these basic principals in initially setting up a supermatrix.

After the ANP supermatrix 101 has been generated, one of the nodes is fixed 103, and row sensitivity of the node is measured using (i) a predetermined increase value, and/or (ii) a predetermined decrease value. For the entire duration that the node is fixed and the row sensitivity is measured, the same proportionality in the ANP weighted supermatrix is maintained, for all of the nodes. As a part of performing row sensitivity, synthesized alternative scores are changed.

Then, a distance change value is generated 105 for the node on which row sensitivity was performed, based on how much the synthesized alternative scores traveled during the ANP row sensitivity. One or more metrique calculations are provided, in order to compare the way that different nodes influence alternatives scores.

In this example, four metrique calculations are provided, and the distance change value for the node(s) can be run through one or more of the metrique calculations. In this example, the metrique calculations are a taxi cab metrique 107, a percent change metrique calculation 109, a maximum percent change metrique 111, and a rank change metrique 113. The taxi cab metrique 107 measures how far the alternatives score has been moved, that is, the distance, e.g., a change from 0.01 to 0.02 is 0.01. The percent change metrique calculation 109 measures how much change there was from the starting value, e.g., a change from 0.01 to 0.02 is a 100% change. The maximum percent change metrique 111 looks at the largest percent change in an alternative's an alternative's scores. The rank change metrique 113 formulates how much the rankings were changed by the row sensitivity, e.g., when the largest component changed to become the fourth largest.

To provide a single score per node which reflects the distance change value and scores, the set of alternative scores from two or more metriques are combined 115 into a single score for the node. For example, the scores can be averaged, and the average can be weighted. The weighting can be selected depending on what is more significant. For example, if it is most significant when rankings are changed, the rank change metrique can be weighted more heavily in the average than other metriques. Techniques for combining scores and preparing averages are known. The combination step 115 can be skipped if not desired, for example, if there is only one metrique calculation or if separate values for each of the individual metriques are desired.

Then, it may be desirable to compare 117 a set of the alternative scores developed from the above-illustrated metriques calculations 107, 109, 111, 113 (or the combined metriques) to a set of alternative scores for another node. Conveniently, the alternative scores for the other node(s) can be tabulated, such as in illustrated table 119 of results.

In table 119 of results, the nodes are listed as well as the row sensitivity increase (e.g., N1HIGH, N2HIGH, N3HIGH) or decrease (e.g., N1 LOW, N2LOW, N3LOW). The designations "TAXI", "% CHG", "MAX % CHG", and "RANK CHG" are illustrated as representative of the calculated result values (illustrated for example in Tables 2, 3, 4 or 5).

Figure 2:
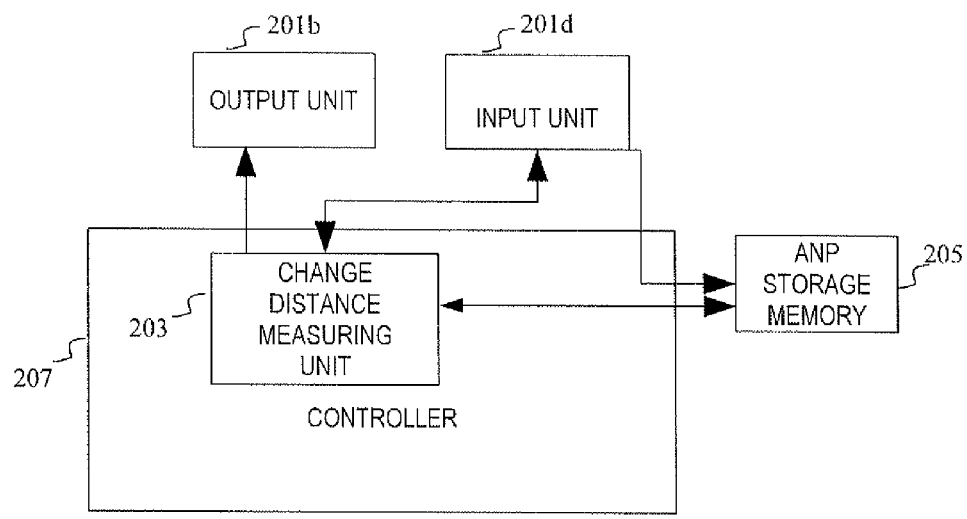
FIG. 2 is a block diagram illustrating a system for measuring change distance.

Referring now to FIG. 2, a block diagram illustrating a system for measuring change distance will be discussed and described. In the illustrated embodiment, there is provided a controller 207, with a change distance measuring unit 203. The change distance measuring unit 203 can access an ANP storage memory 205, in order to measure change distance of nodes in the ANP model in the ANP storage memory 205. Users can interact via an output unit 201b and/or an input unit 201d with the change distance measuring unit 203. Also, users can interact via an input unit 201d with the ANP model stored in the ANP storage memory 205, for example where votes for the ANP model (which can represent votes) are input via the input unit 201*d*. The output unit 201*b* and/or input unit 201*d* can be remote or local.

Figure 3:
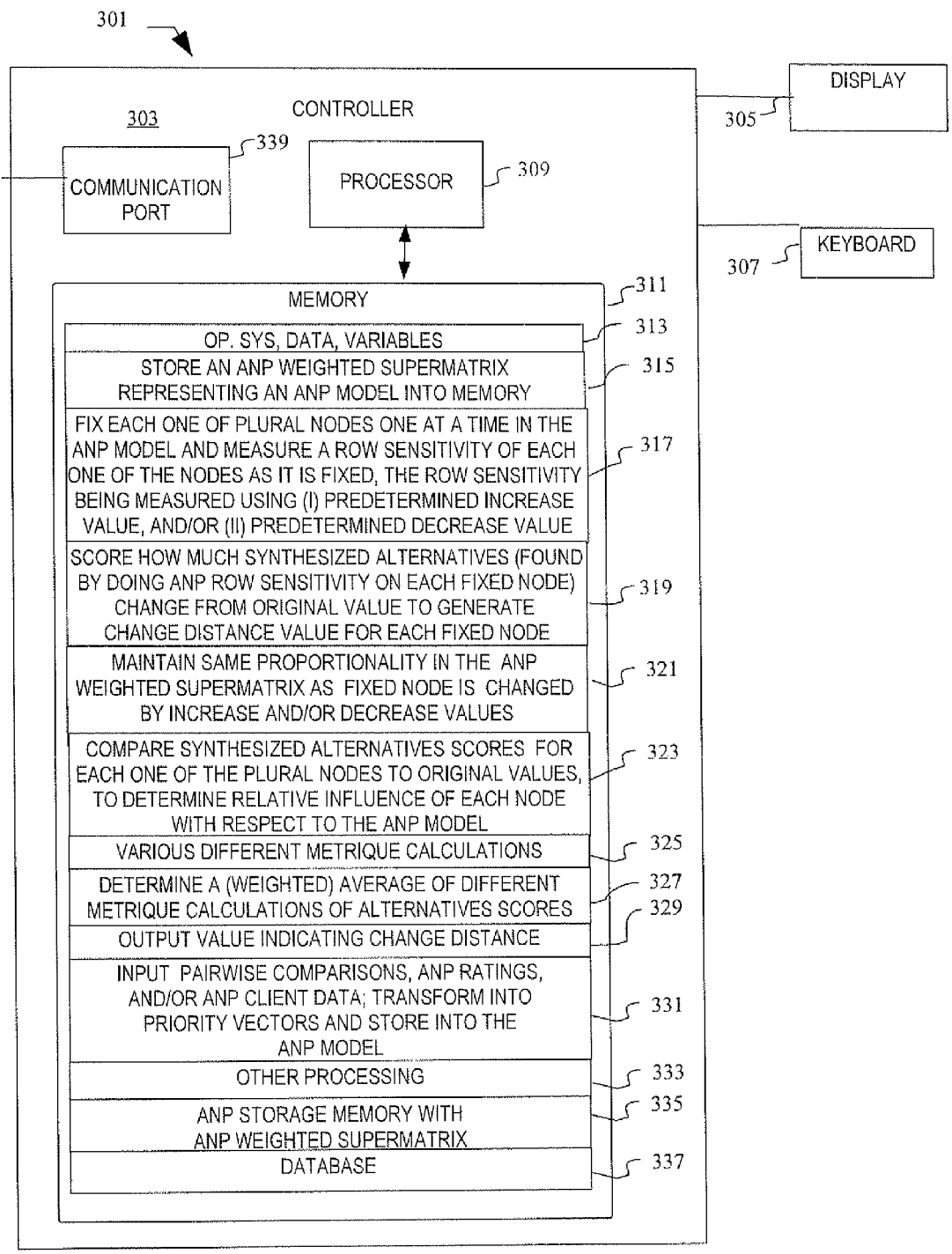
FIG. 3 is a block diagram illustrating portions of an exemplary computer.

Referring now to FIG. 3, a block diagram illustrating portions of an exemplary computer will be discussed and described. The computer 301 may include an optional communication port 339 for communication with an external device (not illustrated), a processor 309, a memory 311, a display 305, and/or a user input device 307, e.g., a keyboard (as illustrated), trackball, mouse, or known voting device. Many of the other elements of a computer are omitted but will be well understood to one of skill in the ad.

The processor 309 may comprise one or more microprocessors and/or one or more digital signal processors. The memory 311 may be coupled to the processor 309 and may comprise a read-only memory (ROM), a random-access memory (RAM), a programmable ROM (PROM), and/or an electrically erasable read-only memory (EEPROM). The memory 311 may include multiple memory locations for storing, among other things, an operating system, data and variables 313 for programs executed by the processor 309; computer programs for causing the processor to operate in connection with various functions such as to store 315 an ANP weighted supermatrix representing an ANP model, to fix 317 each one of plural nodes in the ANP model and measure a row sensitivity of each of the nodes, to score 319 how much synthesized alternatives change from an original value to generate a change distance value, to maintain 321 the same proportionality in the ANP weighted supermatrix, to compare 323 synthesized alternatives scores for each one of the nodes to original values to determine relative influence of the node, to perform various different metrique calculations 325, to determine 327 an average of different metrique calculations of alternatives scores, to output 329 a value indicating the change distance, to input 331 pairwise comparisons, ANP ratings, and/or ANP client data, and transform the data into priority vectors and store into an ANP storage memory 335, and/or other processing 333; the ANP storage memory 335 in which the ANP weighted supermatrix is stored; and a database 337 for other information used by the processor 309. The computer programs may be stored, for example, in ROM or PROM and may direct the processor 309 in controlling the operation of the computer 301.

The user may invoke functions accessible through the user input device 307. The user input device 307 may comprise one or more of various known input devices, such as a keypad, a computer mouse, a touchpad, a touch screen, a trackball, a keyboard and/or a button device configured to register votes. Responsive to signaling received from the user input device 307, in accordance with instructions stored in memory 311, or automatically upon receipt of certain information via the communication port 339, the processor 309 may direct information in storage or information received by the user input device to be processed by the instructions stored in memory 311.

The display 305 may present information to the user by way of a text and/or image display 305 upon which information may be displayed. The display 305 may present information to the user by way of an available liquid crystal display (LCD), plasma display, video projector, light emitting diode (LED) or organic LED display, cathode ray tube, or other visual display; and/or by way of a conventional audible device (such as a speaker, not illustrated) for playing out audible messages.

The processor 309 can be programmed to store 315 an ANP weighted supermatrix representing an ANP model. Before storing the ANP weighted supermatrix, values in the ANP weighted supermatrix can be obtained from an ANP model, for example, by inputting pairwise comparisons and creating an ANP weighted supermatrix therefrom, through various known techniques. An ANP weighted supermatrix representing the ANP model which is created can be generated, and the ANP supermatrix and/or the ANP model can be stored in memory. The memory can be local as illustrated (e.g., ANP storage memory with ANP weighted supermatrix), or can be remote if preferred.

The processor 309 can be programmed to fix 317 each one of plural nodes in the ANP model and measure a row sensitivity of each of the nodes. This has been discussed above in detail, and will not be repeated here.

The processor 309 can be programmed to score 319 how much synthesized alternatives change from an original value to generate a change distance value. This also was discussed above in detail.

The processor 309 can be programmed to maintain 321 the same proportionality in the ANP weighted supermatrix. The same proportionality is maintained while preserving the ANP structure. The proportionality is maintained throughout the measuring of row sensitivity of the node in the ANP weighted supermatrix as it is changed to be less important and/or more important relative to the ANP model and then its distance measured.

To preserve the ANP structure, connections are not created or destroyed. That is, an entry in the matrix is not changed to or from zero, since a non-zero value represents a connection whereas a zero value indicates that there is no connection.

Preserving proportionality is a more difficult consideration. So, the question is, if I am making changes to this row, what is the most proportionality I can keep? Hence, maintaining proportionality is the more difficult and/or subtle problem for figuring out how this should behave.

No connections in the ANP network are created or destroyed by doing this present process. If a priority is zero, then there is no connection to another node. If that is ever changed from zero to something, then a connection has been created by the system, which is bad because the user did not create the connection. The change from zero changes the ANP structure because it creates a connection that was not there originally. Likewise, taking a non-zero value (which is a connection) and changing it to zero deletes a connection which was there. An embodiment of the present process does not create or destroy connection.

Now consider how to preserve as much of proportionality as possible, that is, preserving the ratios of the numbers involved in the ANP model as possible. If, in the original ANP model, e.g., node A is twice as good as node B, that proportionality is maintained as much as possible. It cannot be kept exactly, because that means nothing can be changed. However, by doing row sensitivity, you will break a few proportionalities. There is no choice. But, the other proportionalities you want to keep.

That is, to keep proportionality while changing a node to test that node, you are attempting to maintain proportionality for the other non-changed nodes. Proportionality involves a node and a with-respect-to, and you want to preserve those proportionalities as much as possible.

To measure sensitivity, a row will be changed. There is one way to change that row to keep as much proportionality throughout the ANP network as possible.

While maintaining proportionality, trivial columns are not changed. That is, something that is not connected, stays that way; or something that is only connected to itself, stays that way.

While maintaining proportionality, connections are not created. Also, connections are not destroyed. To summarize, in order to preserve ANP structure, connections are not created or destroyed.

There are two cases: the case of perturbing downward, and the case of perturbing upward. "Perturbing downward" is decreasing the influence/importance of a node to look at its sensitivity. "Perturbing upward" is increasing the importance of a node to look at its sensitivity. Both cases are going to tell you in each case what kind of proportionality is to be maintained.

The processor 309 can be programmed to compare 323 synthesized alternatives scores for each one of the plural nodes to their original values, to determine relative influence of each node with respect to the ANP model.

The processor 309 can be programmed to perform one or more of various different metrique calculations 325. Mentioned above are the taxi cab metrique, percent change metrique, maximum percent change metrique, and rank change metrique. Variations, extensions, and adaptations of these can be used as metrique calculations, and other metrique calculations are possible as well.

The principles described herein with respect to alternatives can be extended to other nodes in the AHP model.

The processor 309 can be programmed to determine 327 an average of different metrique calculations of alternatives scores. Optionally, the average can be weighted to place more emphasis on one calculation or result than another. Techniques are known for determining averages and weighted averages.

The processor 309 can be programmed to output 329 a value indicating the change distance. That is, an indication of the distance change values which were calculated, the average of metriques calculations, and/or the weighted average of change calculations can be visually displayed for a user. For example, the numerical value(s) for the nodes of the ANP model can be presented to the user, or a chart can be provided showing the calculated metriques distance change values for one or more nodes in the ANP model. By such distance change values, a user can ascertain which nodes are most influential to the decision. The user could then use that information to decide on factors to focus on giving more precise information about (for instance if Political is most influential then the user should be absolutely certain they have precise numerical information about Political to the best of their ability). The user can also see how individual nodes contribute to the overall decision, in a way that is not possible with known techniques.

The processor 309 can be programmed to input 331 pairwise comparisons, ANP ratings, and/or ANP client data, and transform the data into priority vectors and store into an ANP storage memory 335. As with traditional ANP, alternatives can be pairwise compared. The data which is input can be transformed into priority vectors, as with traditional ANP, and matrix transformations can be prepared. The result can be stored into the ANP, such as the ANP storage memory 335 with ANP weighted supermatrix in the memory 311.

Optionally, other components may be incorporated in the computer 301 to produce other actions. For example, a user can interface with the computer 301, via a known user interface such as OUTLOOK software, WINDOWS software, and/or other commercially available interfaces. Further, the computer 301 can send and receive transmissions via known networking applications operating with the communication port 339 connected to a network, for example, a local area network, intranet, or the Internet and support software.

It should be understood that various embodiments are described herein in connection with logical groupings of programming of functions. One or more embodiments may omit one or more of these logical groupings. Likewise, in one or more embodiments, functions may be grouped differently, combined, or augmented. For example, in one or more embodiments, the synthesizer can be omitted. In addition, some of these functions may be performed predominantly or entirely on one or more remote computers (not illustrated); and therefore such functions can be reduced or omitted from the processor 409 and distributed to the remote computer. Similarly, the present description may describe various databases or collections of data and information. One or more embodiments can provide that databases or collections of data and information can be distributed, combined, or augmented, or provided locally (as illustrated) and/or remotely (not illustrated).

The ANP storage memory 335 is illustrated as being part of memory 311 stored locally on the controller 303. It will be appreciated that the ANP storage memory 335 can be stored remotely, for example, accessed via the communication port 339 or similar.

The computer 301 can include one or more of the following, not illustrated: a floppy disk drive, an optical drive, a hard disk drive, a removable USB drive, and/or a CD ROM or digital video/versatile disk, which can be internal or external. The number and type of drives can vary, as is typical with different configurations, and may be omitted. Instructions which are executed by the processor 309 and/or an ANP model can be obtained, for example, from the drive, via the communication port 339, or via the memory 311.

Referring now to FIG. 4, a flow chart illustrating a procedure to measure change distance of nodes in an ANP model will be discussed and described. The procedure can advantageously be implemented on, for example, a processor of a controller, described in connection with FIG. 3 or other apparatus appropriately arranged. In overview, the procedure 401 includes storing 403 an ANP weighted supermatrix representing an ANP model; fixing 405 each one of plural nodes and measuring row sensitivity of each of the nodes using (i) predetermined increase and/or (ii) predetermined decrease; and throughout the process of fixing and measuring 405, maintaining 407 a same proportionality of the stored ANP weighted supermatrix. The procedure 401 can also include scoring 409 how much synthesized alternatives scores found by doing the ANP row sensitivity changes, to generate a value indicating a change distance. The procedure 401 can also include outputting 411 the determined distance by which the node was changed. Furthermore, the procedure 401 can include inputting 413 ANP data (e.g., pairwise comparisons) and storing it into the ANP weighted supermatrix. The inputting 413 can continue until, for example, the user is done 415 inputting, e.g., pairwise comparisons, and then can end 417. Each of these is explained in more detail below, except that details which have been previously discussed may not be repeated below.

The procedure 401 can include storing 403 an ANP weighted supermatrix representing an ANP model. Before storing the ANP weighted supermatrix, values in the ANP weighted supermatrix can be obtained from an ANP model, for example, by inputting pairwise comparisons and creating an ANP weighted supermatrix therefrom, through various known techniques.

The procedure 401 can include fixing 405 each one of plural nodes and measuring row sensitivity of each of the nodes using (i) predetermined increase and/or (ii) predetermined decrease. This has been discussed above in detail, and will not be repeated here.

The procedure 401 can include, throughout the process of fixing and measuring 405, maintaining 407 a same proportionality of the stored ANP weighted supermatrix. This has been discussed above in detail. Although the priorities are perturbed, the proportionality in the ANP weighted supermatrix of the unperturbed nodes to each other is maintained. The measuring and fixing 405 and the maintaining of proportionality 407 are illustrated in parallel since they both are performed simultaneously, so that even as the measurements 405 are taken by changing the importance of the fixed node, the proportionality of the stored ANP weighted supermatrix is maintained 407.

The procedure 401 can also include scoring 409 how much synthesized alternatives scores found by doing the ANP row sensitivity changes, to generate a value indicating a change distance. This also has been discussed in detail above.

The procedure 401 can also include outputting 411 the determined change distance. For example, the synthesized alternative scores from metriques calculations can be output, and/or the results from two or more metriques calculations can be output in a visual representation. A user can make a decision regarding changes to the ANP model, for example based on the change distance which is output.

Furthermore, the procedure 401 can include inputting 413 ANP data (e.g., pairwise comparisons) and storing it into the ANP weighted supermatrix. The inputting 413 can continue until, for example, the user is done 415 inputting, e.g., pairwise comparisons. The input of revised or new pairwise comparisons, rating, and/or ANP client data into the ANP weighted supermatrix can be done in accordance with known techniques for modifying data in an ANP, such as by interacting with a user. The process 401 can input 413 pairwise comparisons, ANP ratings, and/or ANP client data. The user interface side of inputting pairwise comparisons, ratings, or client data can be performed according to known techniques. For example, the process 401 can query the user to input, "with respect to opportunities, which is more important: social or political?" to input values of a pairwise comparison of the social and political opportunities nodes. Also, the process 401 can transform the input values into priority vectors in accordance with known techniques. Further, the process 401 can store the new or modified input values and the priority vectors into the ANP model. The process can loop if not done 415 inputting pairwise comparisons, or can finish at an end 417.

Figure 5:
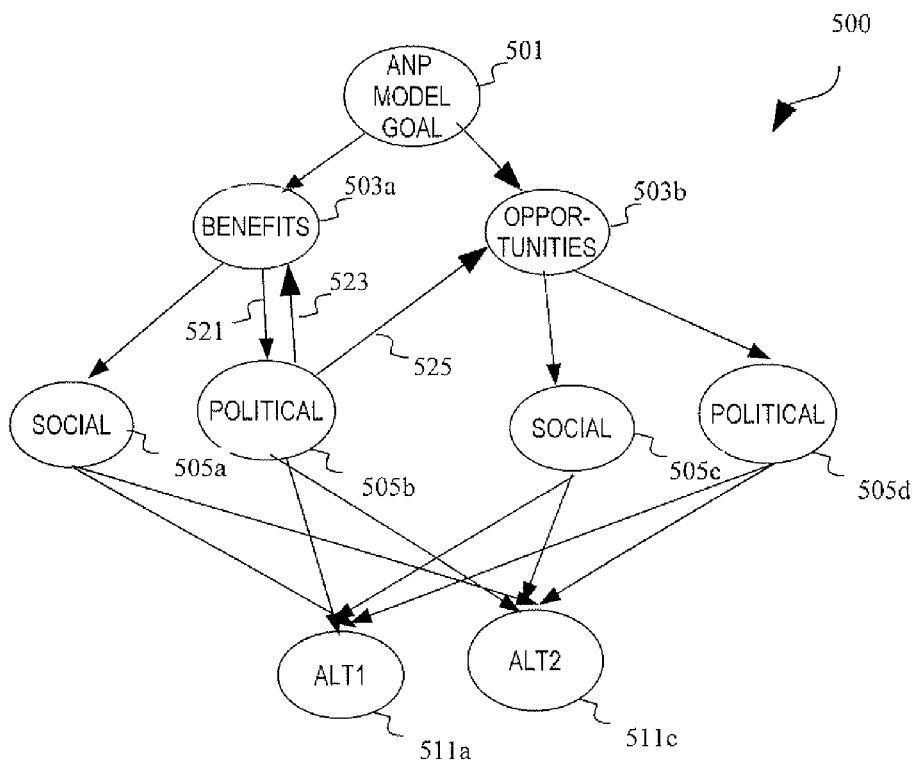
FIG. 5 is a diagram illustrating a simplified representation of an ANP model.

Referring now to FIG. 5, a diagram illustrating a simplified representation of an ANP model will be discussed and described. The illustration is simplified for ease of discussion. In the ANP model, there are conventionally provided control criteria that are benefits, costs, opportunities, and risks (commonly abbreviated BOOR). At the top of the ANP model 500, there is provided an ANP model goal 501, benefits 503a and opportunities 503b. (The usual costs and risks are not shown.) The benefits 503a is a node that includes a one way directional link from the benefits 503a node to the social benefits node 505a and the political benefits node 505b. The opportunities 503b is a node that includes a one way directional link from the Opportunities 503b node to the social opportunities node 505c and the political opportunities node 505d. The political benefits node 505b includes a one way directional connection to the benefits node 503a and the opportunities node 503b. Each of the social benefits node 505a, the political benefits node 505b, the social opportunities node 505c and the political opportunities node 505d includes a separate one-way directional connection to alternative 1 511a and alternative 2 511c.

In a conventional ANP model, the connection defines how important the destination node is to the source node. Hence, a connection is directional, that is, it has a from direction and a to direction. For example, a connection from the conventional ANP model goal 501 to the benefits node 503a means that the user can define how important benefits are to the goal.

One of skill in this art will know that the ANP model can be represented as a matrix (or series of matrices), where a node is represented as a row in the matrix.

The designations in the following list are defined and expressly used herein as would be understood to one of skill in the ANP art, and not according to a general dictionary, whether singular or plural: "priority," "node", "importance" (or "important"), "sensitivity," "pairwise comparison", "ANP ratings" (or "ratings"), "ANP client data", "priority vectors", "judgment of priority," "ANP alternatives" (or "alternatives"), "criteria", "weight," "cluster," "local," "global," "synthesize." This list is not exhaustive and does not imply that a term not on this list can be interpreted according to a general dictionary instead of according to an understood ANP meaning. Some of these are further explained below for the reader's convenience.

"Pairwise comparison." The point of a pairwise comparison set is to arrive at the priorities of a group of things. These things may be criteria (so-called "alternatives" in the traditional ANP sense), or ratings scales. In a classic example of doing pairwise comparisons, one can answer the question, "how many times better is X than Y" for all X and Y being compared.

"ANP Ratings." If one thinks of a single column of the conventional ANP's rating system as conventionally represented in a matrix, its point is to assign ideal priorities to the alternatives (with respect to a criteria). The ratings prioritize alternatives in a set of alternatives. In a classic example of doing ANP ratings, one first sets up ratings words like "High", "Medium" and "Low", and gives scores to those words; then each of the things being rated is assigned a "High", "Medium" or "Low."

"ANP client data." ANP client data are data that represent real world values. For example, in a decision about an automobile purchase, ANP client data could be miles per gallon, number of passengers, headroom, cubic size of storage, etc.

The term "analytic network process" ("ANP") model, sometimes referred to as an ANP network model, an ANP network or similar, is defined herein to refer to a form of an analytic hierarchy process (AHP) in which values for higher level elements are affected by lower level elements and take the dependency of the lower level elements into account; further in the ANP model, the importance of the criteria determines the importance of the alternatives (as in an AHP); the importance of the alternatives themselves determines the importance of the criteria; further, the ANP model additionally has influence flowing between non-downward elements (in comparison to a conventional AHP model, in which influence flows only downwards); further the ANP model is a network, that is not a top-down-tree, of priorities and alternative choices. The terms "criteria" and "alternatives" are understood to those of skill in the AHP art. An ANP is further discussed in, e.g., Saaty, T. L. (2001) *Decision Making with Dependence and Feedback; the Analytic Network Process*, $2^{nd}$ edition.

The term "ANP weighted supermatrix" is defined as the supermatrix which is created from the ANP model, and which has been weighted, in accordance with ANP theory, and variations, extensions, and/or evolutions of such ANP theory. The ANP supermatrix is understood to be represented in rows and columns.

The above is sometimes described in terms of a single user, for ease of understanding and illustration. However, it is understood that multiple users can be accommodated in various embodiments. For example, multiple users each can input pairwise comparisons.

Furthermore, the devices of interest may include, without being exhaustive, general purpose computers, specially programmed special purpose computers, personal computers, distributed computer systems, calculators, handheld computers, keypads, laptop/notebook computers, mini computers, mainframes, super computers, personal digital assistants, communication devices, any of which can be referred to as a "computer", as well as networked combinations of the same, and the like, although other examples are possible as will be appreciated by one of skill in the art, any of which can be referred to as a "computer-implemented system."

One or more embodiments may rely on the integration of various components including, as appropriate and/or if desired, hardware and software servers, database engines, and/or other content providers. One or more embodiments may be connected over a network, for example the Internet, an intranet, a wide area network (WAN), a local area network (LAN), or even on a single computer system. Moreover, portions can be distributed over one or more computers, and some functions may be distributed to other hardware, in accordance with one or more embodiments.

Any presently available or future developed computer software language and/or hardware components can be employed in various embodiments. For example, at least some of the functionality discussed above could be implemented using C, C++, Java or any assembly language appropriate in view of the processor being used.

One or more embodiments may include a process and/or steps. Where steps are indicated, they may be performed in any order, unless expressly and necessarily limited to a particular order. Steps that are not so limited may be performed in any order.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. An apparatus comprising:
an analytic network process (ANP) storage memory that stores an ANP weighted supermatrix representing an ANP model; and
a processor in communication with the ANP storage memory, the processor being configured to facilitate fixing each one of plural nodes one at a time in the ANP model and measuring a row sensitivity of each one of the plural nodes as it is fixed, the row sensitivity being measured using one or both of (i) a predetermined increase value and (ii) a predetermined decrease value;
scoring how much synthesized alternatives scores found by doing ANP row sensitivity on each of the plural fixed nodes change from original values thereof, to generate a value indicating a change distance for each one of the plural nodes;
maintaining a same proportionality in the stored ANP weighted supermatrix as the fixed node is changed by the one or both of the predetermined increase and decrease values: and
utilizing a weighted average of different metrique calculations of the alternative scores on the space where a metrique is defined according to:

$$x=(x_1, x_2, \ldots, x_n) \, y=(y_1, y_2, \ldots, y_n)$$

are two vectors in $R^n$, where
$R^n$ is real n-space with the ANP model,
$x_i$ is a starting alternative score for alternative i, and $y_i$ is an ending alternative score for the alternative i, and
$d: R^n \times R^n \to R$ a continuous function is a metrique calculation iff for all $x, y \in R^n$ $$d(x,y) \geq 0, \text{ and}$$

$$d(x,x) = 0.$$

2. The apparatus of claim 1, wherein the row sensitivity uses both the predetermined increase and decrease values, to measure the effect on the synthesized alternatives scores that is caused by changing an importance of each one of the fixed plural nodes by a same amount.

3. The apparatus of claim 1, further comprising comparing the synthesized alternatives scores for each one of the plural nodes in the ANP model to the original values thereof, to determine the relative influence of each one of the plural nodes with respect to the ANP model.

4. The apparatus of claim 1, wherein the alternatives scores for each of the plural fixed nodes are synthesized from an induced family of ANP models formed by row perturbations of each of the fixed nodes in the stored ANP weighted supermatrix.

5. The apparatus of claim 1, further comprising:
an output unit in communication with the processor and configured to output, for a display to a user, the value indicating a change distance for each one of the plural nodes.

6. The apparatus of claim 1, further comprising
an input unit configured to input, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

7. A method, comprising:
storing, in an analytic network process (ANP) storage memory, an ANP weighted supermatrix representing an ANP model;
in a processor in communication with the ANP storage memory, storing, in an analytic network process (ANP) storage memory, an ANP weighted supermatrix representing an ANP model;

fixing each one of plural nodes one at a time in the ANP model and measuring a row sensitivity of each one of the plural nodes as it is fixed, the row sensitivity being measured using one or both of (i) a predetermined increase value and (ii) a predetermined decrease value;

scoring how much synthesized alternatives scores found by doing ANP row sensitivity on each of the plural fixed nodes changes from original values thereof, to generate a value indicating a change distance for each one of the plural nodes;

maintaining a same proportionality in the stored ANP weighted supermatrix as the fixed node is changed by the one or both of the predetermined increase and decrease values and utilizing a weighted average of different metrique calculations of the alternative scores on the space $R^n$, where a metrique is defined according to:

$$x=(x_1, x_2, \ldots, x_n)\, y=(y_1, y_2, \ldots, y_n)$$

are two vectors in $R^m$, where $R^n$ is real n-space with the ANP model, $x_i$ is a starting alternative score for alternative i, $y_i$ is an ending alternative score for the alternative i, and d:$R^n \times R^n \to R$ a continuous function is a metrique calculation iff for all x, y∈$R^n$ $d(x,y) \geq 0$, and $d(x,x)=0$.

8. The method of claim 7, wherein the row sensitivity uses both the predetermined increase and decrease values, to measure the effect on the synthesized alternatives scores that is caused by changing an importance of each one of the fixed plural nodes by a same amount.

9. The method of claim 7, further comprising comparing the synthesized alternatives scores for each one of the plural nodes in the ANP model to the original values thereof, to determine the relative influence of each one of the plural nodes with respect to the ANP model.

10. The method of claim 7, wherein the alternatives scores for each of the plural fixed nodes are synthesized from an induced family of ANP models formed by row perturbations of each of the fixed nodes in the stored ANP weighted supermatrix.

11. The method of claim 7, further comprising:
outputting, to an output unit in communication with the processor, for display to a user, the value indicating the change distance for each one of the plural nodes.

12. The method of claim 7, further comprising:
inputting, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

13. A non-transitory computer-readable storage medium encoded with a computer executable instructions, wherein execution of said computer executable instructions by one or more processors causes a computer to perform the steps of:
storing, in an analytic network process (ANP) storage memory, an ANP weighted supermatrix representing an ANP model;

fixing each one of plural nodes one at a time in the ANP model and measuring a row sensitivity of each one of the plural nodes as it is fixed, the row sensitivity being measured using one or both of (i) a predetermined increase value and (ii) a predetermined decrease value;

scoring how much synthesized alternatives scores found by doing ANP row sensitivity on each of the plural fixed nodes changes from original values thereof, to generate a value indicating a change distance for each one of the plural nodes;

maintaining a same proportionality in the stored ANP weighted supermatrix as the fixed node is changed by the one or both of the predetermined increase and decrease values; and utilizing a weighted average of different metrique calculations of the alternative scores on the space $R^n$, where a metrique is defined according to:

$$x=(x_1, x_2, \ldots, x_n)\, y=(y_1, y_2, \ldots, y_n)$$

are two vectors in $R^m$, where $R^n$ is real n-space with the ANP model, $x_i$ is a starting alternative score for alternative i, $y_i$ is an ending alternative score for the alternative i, and d: $R^n \times R^n \to R$ a continuous function is a metrique calculation iff for all x, y∈$R^n$ $d(x,y) \geq 0$, and $d(x,x)=0$.

14. The computer-readable storage medium of claim 13, wherein the row sensitivity uses both the predetermined increase and decrease values, to measure the effect on the synthesized alternatives scores that is caused by changing an importance of each one of the fixed plural nodes by a same amount.

15. The computer-readable storage medium of claim 13, further comprising comparing the synthesized alternatives scores for each one of the plural nodes in the ANP model to the original values thereof, to determine the relative influence of each one of the plural nodes with respect to the ANP model.

16. The computer-readable storage medium of claim 13, wherein the alternatives scores for each of the plural fixed nodes are synthesized from an induced family of ANP models formed by row perturbations of each of the fixed nodes in the stored ANP weighted supermatrix.

17. The computer readable storage medium of claim 13, further comprising instructions for:
outputting, to an output unit in communication with the processor, for display to a user, the value indicating the change distance for each one of the plural nodes.

18. The computer readable storage medium of claim 13, further comprising instructions for:
inputting, from an input device, pairwise comparisons, ANP ratings, or ANP client data, which are transformed into priority vectors and stored into the ANP weighted supermatrix, the pairwise comparisons representing a judgment of priority between ANP alternatives in the pair, the ANP ratings representing a rating of a choice, and the ANP client data representing real world values.

* * * * *